(12) United States Patent
Lettow et al.

(10) Patent No.: US 9,292,345 B2
(45) Date of Patent: Mar. 22, 2016

(54) SYSTEMS, METHODS, AND COMPUTER PROGRAM PRODUCTS FOR PROCESSING SETS OF INSTRUCTIONS FOR MOBILE DEVICES

(71) Applicant: GOOGLE INC., Mountain View, CA (US)

(72) Inventors: Greg A. Lettow, Leawood, KS (US); Kiran H. Srinivasamurthy, Bangalore (IN); Michael J. Gargiulo, Corinth, TX (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/324,753

(22) Filed: Jul. 7, 2014

(65) Prior Publication Data

US 2015/0012921 A1 Jan. 8, 2015

Related U.S. Application Data

(60) Provisional application No. 61/843,708, filed on Jul. 8, 2013.

(51) Int. Cl.
*G06F 9/46* (2006.01)
*G06F 9/48* (2006.01)
*H04W 4/00* (2009.01)

(52) U.S. Cl.
CPC .............. *G06F 9/4881* (2013.01); *H04W 4/003* (2013.01)

(58) Field of Classification Search
CPC .................................. G06F 8/65; G06F 9/4881
USPC ..................................... 717/168, 173; 718/102
See application file for complete search history.

(56) References Cited

U.S. PATENT DOCUMENTS

| | | | |
|---|---|---|---|
| 5,590,038 A | 12/1996 | Pitroda | 395/241 |
| 5,640,002 A | 6/1997 | Ruppert et al. | 235/472 |

(Continued)

FOREIGN PATENT DOCUMENTS

| | | |
|---|---|---|
| CA | 2 381 614 A1 | 3/2001 |
| EP | 1 222 503 A2 | 7/2002 |

(Continued)

OTHER PUBLICATIONS

Int'l Search Report and Written Opinion issued in connection with Int'l Appl'n No. PCT/US2014/045574 on Sep. 30, 2014 (9 pages).

*Primary Examiner* — Andy Ho

(74) *Attorney, Agent, or Firm* — Johnson, Marcou & Isaacs, LLC

(57) ABSTRACT

Systems, methods, and computer program products are provided for managing processes. A command is received to process one or more workflows, each of the one or more workflows including a set of instructions. A request for identification of one or more devices meeting predefined criteria is issued. A device identifier (ID) and data corresponding to each of the one or more devices meeting the predefined criteria are stored in a database. The one or more workflows are processed for each of the one or more devices meeting the predefined criteria by executing the set of instructions included in the one or more workflows. Executing the set of instructions included in the one or more workflows includes calling one or more functions to be performed by one or more communicatively coupled systems.

23 Claims, 6 Drawing Sheets

(56) References Cited

U.S. PATENT DOCUMENTS

| | | |
|---|---|---|
| 5,748,740 A | 5/1998 | Curry et al. ............... 380/25 |
| 5,805,702 A | 9/1998 | Curry et al. ............... 380/24 |
| 5,884,271 A | 3/1999 | Pitroda .................... 705/1 |
| 5,901,303 A | 5/1999 | Chew ..................... 395/400 |
| 5,940,510 A | 8/1999 | Curry et al. ............... 380/25 |
| 5,949,880 A | 9/1999 | Curry et al. ............... 380/24 |
| 6,073,840 A | 6/2000 | Marion ................... 235/381 |
| 6,105,013 A | 8/2000 | Curry et al. ............... 705/65 |
| 6,116,505 A | 9/2000 | Withrow .................. 235/381 |
| 6,131,811 A | 10/2000 | Gangi .................... 235/380 |
| 6,237,095 B1 | 5/2001 | Curry et al. .............. 713/178 |
| 6,422,464 B1 | 7/2002 | Terranova ................ 235/384 |
| 6,587,835 B1 | 7/2003 | Treyz et al. .............. 705/14 |
| 6,601,759 B2 | 8/2003 | Fife et al. ................ 235/375 |
| 6,671,358 B1 | 12/2003 | Seidman et al. ........ 379/93.12 |
| 6,732,081 B2 | 5/2004 | Nicholson ................. 705/14 |
| 6,769,607 B1 | 8/2004 | Pitroda et al. ............ 235/380 |
| 6,813,609 B2 | 11/2004 | Wilson .................... 705/14 |
| 6,837,436 B2 | 1/2005 | Swartz et al. .......... 235/472.02 |
| 6,925,439 B1 | 8/2005 | Pitroda .................... 705/1 |
| 6,986,133 B2 * | 1/2006 | O'Brien et al. ........... 717/173 |
| 7,083,094 B2 | 8/2006 | Cooper ................... 235/449 |
| 7,110,792 B2 | 9/2006 | Rosenberg ............... 455/558 |
| 7,127,236 B2 | 10/2006 | Khan et al. ............. 455/414.1 |
| 7,155,405 B2 | 12/2006 | Petrovich ................. 705/26 |
| 7,194,422 B1 | 3/2007 | Killick ................... 705/14 |
| 7,216,109 B1 | 5/2007 | Donner .................... 705/64 |
| 7,249,112 B2 | 7/2007 | Berardi et al. ............. 705/79 |
| 7,286,818 B2 | 10/2007 | Rosenberg ............... 455/414.1 |
| 7,298,271 B2 | 11/2007 | Sprogis .................. 340/572.1 |
| 7,308,426 B1 | 12/2007 | Pitroda ................... 705/35 |
| 7,330,714 B2 | 2/2008 | Rosenberg ............... 455/412.1 |
| 7,349,885 B2 | 3/2008 | Gangi ..................... 705/41 |
| 7,469,151 B2 | 12/2008 | Khan et al. ............... 455/558 |
| 7,469,381 B2 | 12/2008 | Ording ................... 715/702 |
| 7,483,858 B2 | 1/2009 | Foran et al. ............... 705/39 |
| 7,494,055 B2 | 2/2009 | Fernandes et al. ......... 235/380 |
| 7,529,563 B1 | 5/2009 | Pitroda .................. 455/558 |
| 7,571,139 B1 | 8/2009 | Giordano et al. ........... 705/40 |
| 7,581,678 B2 | 9/2009 | Narendra et al. .......... 235/451 |
| 7,613,628 B2 | 11/2009 | Ariff et al. ................ 705/14 |
| 7,631,810 B2 | 12/2009 | Liu et al. ................. 235/451 |
| 7,693,752 B2 | 4/2010 | Jaramillo ................. 705/26 |
| 7,708,198 B2 | 5/2010 | Gangi .................... 235/380 |
| 7,712,658 B2 | 5/2010 | Gangi .................... 235/380 |
| 7,775,430 B2 | 8/2010 | Lin ....................... 235/383 |
| 7,805,615 B2 | 9/2010 | Narendra et al. .......... 713/186 |
| 7,828,214 B2 | 11/2010 | Narendra et al. .......... 235/451 |
| 7,856,377 B2 | 12/2010 | Cohagan et al. .......... 705/14.3 |
| 7,864,163 B2 | 1/2011 | Ording et al. ............. 345/173 |
| 7,942,337 B2 | 5/2011 | Jain ...................... 235/492 |
| 7,954,715 B2 | 6/2011 | Narendra et al. .......... 235/451 |
| 7,954,716 B2 | 6/2011 | Narendra et al. .......... 235/451 |
| 7,954,717 B2 | 6/2011 | Narendra et al. .......... 235/451 |
| 7,961,101 B2 | 6/2011 | Narendra et al. ......... 340/572.1 |
| 7,967,215 B2 | 6/2011 | Kumar et al. ............. 235/492 |
| 7,991,158 B2 | 8/2011 | Narendra et al. .......... 380/260 |
| 8,023,934 B2 * | 9/2011 | Jeide et al. ............... 455/418 |
| 8,072,331 B2 | 12/2011 | Narendra et al. ......... 340/572.1 |
| 8,083,145 B2 | 12/2011 | Narendra et al. .......... 235/451 |
| 8,091,786 B2 | 1/2012 | Narendra et al. .......... 235/451 |
| 8,131,645 B2 | 3/2012 | Lin et al. ................. 705/51 |
| 8,140,418 B1 | 3/2012 | Casey et al. .............. 705/35 |
| 8,396,808 B2 | 3/2013 | Greenspan ............... 705/64 |
| 8,429,046 B2 | 4/2013 | Pitroda .................. 705/35 |
| 8,515,412 B2 * | 8/2013 | Choi-Grogan et al. ....... 455/419 |
| 2002/0049631 A1 | 4/2002 | Williams ................. 705/14 |
| 2002/0082921 A1 | 6/2002 | Rankin ................... 705/14 |
| 2002/0174025 A1 | 11/2002 | Hind et al. ............... 705/26 |
| 2002/0179703 A1 | 12/2002 | Allen .................... 235/381 |
| 2003/0009382 A1 | 1/2003 | D'Arbeloff et al. ......... 705/17 |
| 2003/0065738 A1 | 4/2003 | Yang et al. ............... 709/215 |
| 2003/0083042 A1 | 5/2003 | Abuhamdeh .............. 455/406 |
| 2003/0115126 A1 | 6/2003 | Pitroda .................. 705/36 |
| 2003/0132298 A1 | 7/2003 | Swartz et al. .......... 235/472.02 |
| 2003/0200489 A1 | 10/2003 | Hars ..................... 714/703 |
| 2004/0073519 A1 | 4/2004 | Fast ..................... 705/65 |
| 2004/0186768 A1 | 9/2004 | Wakim et al. ............. 705/14 |
| 2005/0004866 A1 | 1/2005 | Bonalle et al. ............ 705/39 |
| 2005/0171898 A1 | 8/2005 | Bishop et al. ............. 705/39 |
| 2005/0222961 A1 | 10/2005 | Staib et al. ............... 705/64 |
| 2005/0234769 A1 | 10/2005 | Jain et al. ................ 705/14 |
| 2005/0247777 A1 | 11/2005 | Pitroda .................. 235/380 |
| 2006/0190569 A1 | 8/2006 | Neil et al. ............... 709/220 |
| 2006/0287004 A1 | 12/2006 | Fuqua ................... 455/558 |
| 2007/0014407 A1 | 1/2007 | Narenda et al. ........... 380/259 |
| 2007/0014408 A1 | 1/2007 | Narenda et al. ........... 380/270 |
| 2007/0198432 A1 | 8/2007 | Pitroda et al. ............. 705/64 |
| 2008/0306849 A1 | 12/2008 | Johnson, Jr. et al. ........ 705/35 |
| 2009/0108064 A1 | 4/2009 | Fernandes et al. ......... 235/380 |
| 2009/0164322 A1 | 6/2009 | Khan et al. ............... 705/14 |
| 2010/0241494 A1 | 9/2010 | Kumar et al. ............. 705/14.1 |
| 2010/0262958 A1 | 10/2010 | Clinton et al. ............ 717/171 |
| 2011/0073663 A1 | 3/2011 | Narenda et al. ........... 235/492 |
| 2011/0088026 A1 | 4/2011 | Swann ................... 717/173 |
| 2011/0171996 A1 | 7/2011 | Narenda et al. ........... 455/558 |
| 2011/0223972 A1 | 9/2011 | Narenda et al. ........... 455/558 |
| 2011/0231238 A1 | 9/2011 | Khan et al. ............. 705/14.26 |
| 2011/0244796 A1 | 10/2011 | Khan et al. ............. 455/41.1 |
| 2011/0269438 A1 | 11/2011 | Narenda et al. ......... 455/414.1 |
| 2011/0271044 A1 | 11/2011 | Narenda et al. ........... 711/103 |
| 2011/0272468 A1 | 11/2011 | Narenda et al. ........... 235/492 |
| 2011/0272469 A1 | 11/2011 | Narenda et al. ........... 235/492 |
| 2012/0064828 A1 | 3/2012 | Khan et al. ............. 455/41.1 |
| 2012/0109764 A1 | 5/2012 | Martin et al. ............. 705/17 |
| 2012/0124570 A1 * | 5/2012 | Alberth et al. ............ 717/173 |
| 2012/0323664 A1 | 12/2012 | Klems .................. 705/14.26 |
| 2014/0173581 A1 * | 6/2014 | Grinberg et al. ........... 717/170 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| WO | WO 01/18629 A3 | 3/2001 |
| WO | WO 03/012717 A1 | 2/2003 |

* cited by examiner

SYSTEMS, METHODS, AND COMPUTER PROGRAM PRODUCTS FOR PROCESSING SETS OF INSTRUCTIONS FOR MOBILE DEVICES

CROSS REFERENCE TO RELATED APPLICATION

This application claims priority to U.S. Provisional Application No. 61/843,708, filed Jul. 8, 2013, the contents of which are incorporated herein by reference.

BACKGROUND

1. Field

The present invention generally relates to mobile communication devices, and more particularly to systems, methods, and computer program products for managing processing of sets of instructions on or for mobile devices.

2. Related Art

In a mobile commerce environment, service provider transactions, accounts, products and the like often are stored and processed in a mobile wallet application on a client (e.g., customer) mobile device. A service provider is a company, organization, entity or the like that provides services to customers or consumers. Examples of service providers include account-issuing entities such as banks, merchants, card associations, marketing companies, and transit authorities. A service may be, for example, an applet, application, set of applications or set of code providing an activity, capability, functionality, work, or use permitted or provided by a service provider, such as a payment service, credit, debit, checking, gift, offer or loyalty service, transit pass service, and the like.

Thus, services corresponding to respective service providers may be stored on a mobile device. For example, a service offered by a service provider (e.g., a bank) may be enabled on a mobile device in order to conduct a transaction using that service and/or credential. A customer may then use the mobile device to conduct a transaction, such as a contactless payment, at a point-of-sale, although numerous other transactions or interactions are also possible.

Often, service providers release updates or modifications of services. For example, new versions of a service may be released to incorporate updates or changes, fix bugs in previous versions, or apply a security patch. More generally, a service provider or other entity may wish to install a new service on the mobile device, transmit messages to the mobile device, or otherwise interact with the mobile device to execute processing for services.

Difficulties can arise in the context of executing processing for services on a mobile device. For example, existing technologies may perform steps to cause the mobile device to communicate with (or reach out to or contact) a mobile commerce platform or a service provider in order to obtain (e.g., download) assets such as service updates. It is not uncommon for a user to be required to connect to a mobile commerce system and request an update. As a consequence, unless the user is diligent in seeking out and requesting services, updates, or the like, these assets are left unused. Moreover, a significant burden is created for the user. As an additional matter, timing for conducting updates and the like can be sub-optimal or even impossible if the mobile device is often disconnected from the network, busy, or otherwise not fully available. And, while auto updating may be used to execute updates on a mobile device requiring reduced user interaction, it may not be used to process any functions and/or instructions available for mobile devices.

Therefore, one technical challenge involves providing services, updates, communications, or other assets to a mobile device at a time when such assets are not specifically requested by a user of the mobile device. Another technical challenge involves providing such assets to the mobile device at an appropriate timing (such as at night, if the mobile device is busy during the day). Still another technical challenge involves providing those assets by processing instructions individually or independently for each mobile device in a case where processing is requested for a large group of mobile devices (e.g., all mobile devices of a particular model).

BRIEF DESCRIPTION

The present invention provides systems, methods, and computer program products for processing one or more sets of instructions for mobile devices.

In one embodiment, a command is received to process one or more workflows, each of the one or more workflows including a set of instructions. A request for identification of one or more devices meeting predefined criteria is issued. A device identifier (ID) and data corresponding to each of the one or more devices meeting the predefined criteria are stored in a database. The one or more workflows are processed for each of the one or more devices meeting the predefined criteria by executing the set of instructions included in the one or more workflows. Executing the set of instructions included in the one or more workflows includes calling one or more functions to be performed by one or more communicatively coupled systems.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

I. Overview

Figure 1:
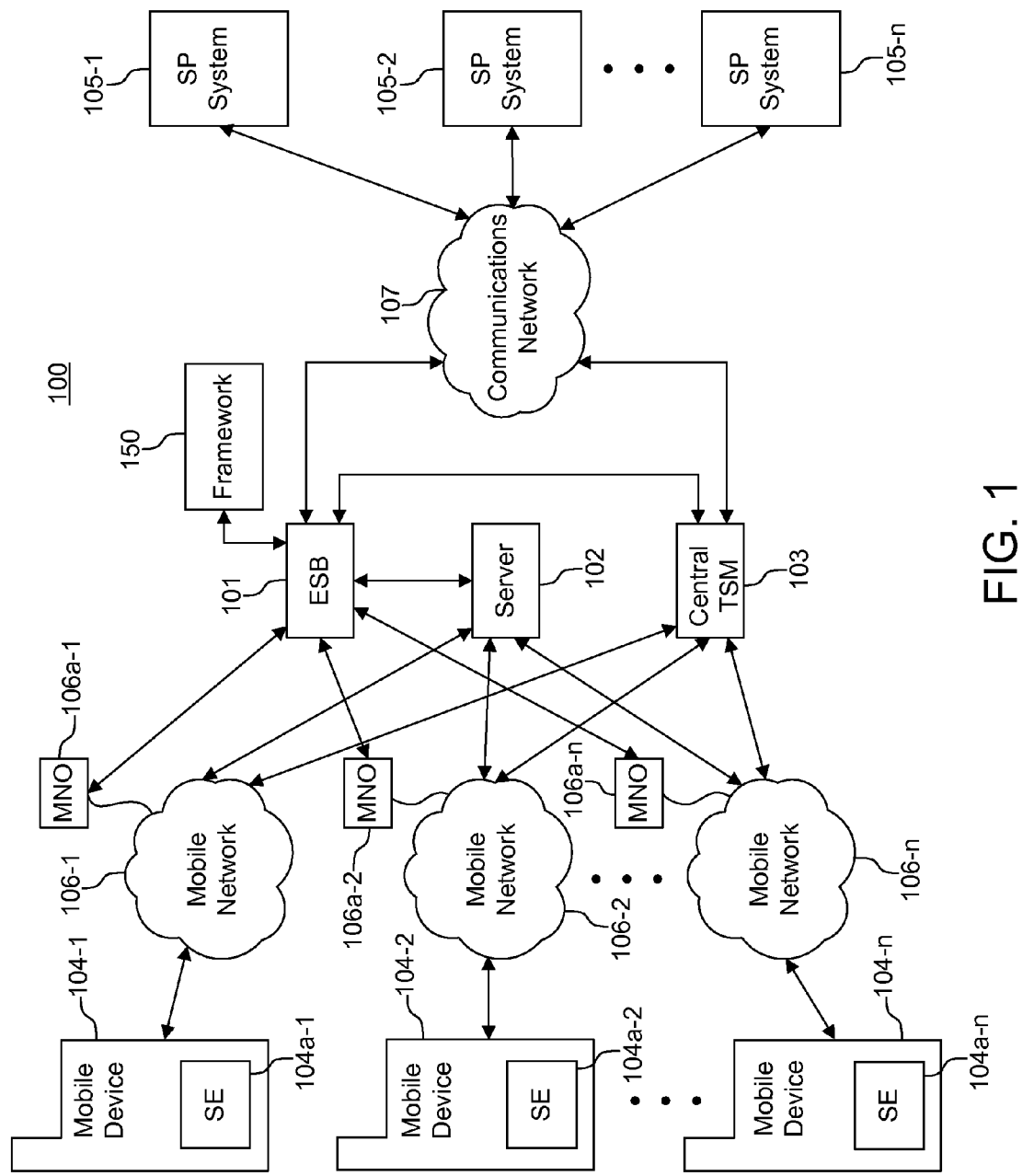
FIG. 1 is a diagram of a system for managing processing according to an example embodiment.

As used herein, "cube" refers to a portion or subset of a memory having stored thereon business rules and one or more executable workflows. A "workflow" includes one or more sets of instructions which are processed to coordinate desired tasks. Each instruction includes, for example, functions, data, and information needed to accomplish a task for a mobile device.

As used herein, "processing" refers to executing or facilitating execution of instructions in order to accomplish a task. For example, a cube may contain a workflow with a set of instructions which are processed to coordinate updating of a service on the mobile device.

As used herein, "function" is a routine including or having commands to perform a specific task. A function may be called by a processor or other device in order to perform all or a portion of the task. For example, a function may include commands to update a value in a memory. Functions may comprise, or include, an application programming interface (API) for specifying how software and/or hardware components should interact with each other.

The terms "applet", "application", "service" and/or the plural form of these terms are used interchangeably herein to refer to an applet (functioning independently or in conjunction with other applets) or set or subset of code, which when executed by one or more processors (e.g., in a mobile device, secure element (SE), card reader, terminal, point of sale (POS) system, server, or the like) causes the processor(s) to perform specific tasks.

As used herein, "campaign" refers to a plan or series of desired activities, from a service provider, which accomplishes a certain result. For example, a "campaign" can refer to a business plan to update services on multiple mobile devices. Specifically, a campaign may require updating a specific service on certain models of mobile device (e.g., all 5,000 handsets of a particular model). In the context described herein, business rules of a campaign (e.g., update all 5,000 handsets of a particular model by June) may be incorporated into a cube, and the corresponding workflow(s) of the cube executed to accomplish the desired activities/tasks.

As used herein, "business rules" refers to a set of rules and/or standards from or issued by a service provider which govern how to accomplish certain tasks. For example, business rules may require that only certain models of a mobile device are provided with an update.

As used herein, "batch" or "pool" processing refers to concurrent multi-device processing, in which one or more workflows are processed concurrently, at least in part, for multiple devices. In one example embodiment, "pool processing" refers to executing a workflow on a "pool" of multiple mobile devices concurrently, although not necessarily on all mobile devices targeted by a campaign at once. As discussed below, the pool processing according to the embodiments herein does not specifically require that each pool is completely finished before scheduling the next pool, and devices can be added to the pool as other devices finish.

II. System

The example embodiments of the invention presented herein are directed to systems, methods, and computer program products for processing one or more sets of instructions for mobile devices, which are now described herein in terms of an example system in a mobile communications environment.

FIG. 1 is a diagram of a system 100 for processing one or more sets of instructions for, e.g., updating a service on one or more mobile devices according to an example embodiment.

As shown in FIG. 1, system 100 includes an enterprise service bus (ESB) 101, which is communicatively coupled to a server 102 (which may also be referred to as a "wallet server" or "mobile wallet server") and a central trusted service manager (TSM) 103.

ESB 101 manages interactions between service provider systems and mobile devices, and grants the service provider systems the ability to efficiently and securely communicate with the mobile devices in order to, for example, set up (e.g., install) a service account or transmit a message, without the need for directly communicating with each mobile device. In an example embodiment, the ESB 101 is hardware and/or software that is implemented to serve as an intermediary between service provider systems 105-1, 105-2, . . . , 105-n (collectively "105"), wallet server 102, central TSM 103 and mobile devices 104. For example, ESB 101 is communicatively coupled to service provider systems 105 via a communications network 107. In one embodiment, service provider systems 105 communicates through ESB 101 to request a task to be performed by a mobile wallet provider as part of a campaign, such as updating services on mobile devices. In an alternative embodiment, a mobile wallet (or mobile wallet user via the mobile wallet interface) may request that a task be performed by the mobile wallet provider by sending a request such as a "pull" request.

The wallet server 102 and the central TSM 103 are each communicatively coupled to mobile devices 104-1, 104-2, . . . , 104-n (collectively "104") via corresponding mobile networks 106-1, 106-2, . . . , 106-n (collectively "106"). Each of the mobile devices 104 includes a corresponding SE 104a-1, 104a-2, . . . , 104a-n (collectively "104a"). Each of the mobile devices 104 may include a user interface such as a display (not shown). Each of the mobile networks 106 is operated by a corresponding mobile network operator (hereafter "MNO") 106a-1, 106a-2, . . . , 106a-n (collectively "106a").

Central TSM 103 is typically an independent entity serving MNOs and account-issuing service providers by provisioning services and applications, such as contactless applications associated with the service providers, on mobile devices. There are a number of sets of instructions which must be processed by a TSM or between a TSM and a mobile device, to accomplish tasks such as installing or updating a service, which may be requested by service provider system 105.

The wallet server 102 and the central TSM 103 communicate with mobile devices 104 via the mobile networks 106, using security protocols such as GlobalPlatform secure channel protocol, SSL, TLS, or the like. Mobile networks 106 may be mobile device cellular networks, radio networks, or the like.

Framework 150 is a portion of memory comprising code and one or more corresponding processors to execute the code, for managing pool processing for any of mobile devices 104 (and corresponding SE 104a). For example, framework 150 may coordinate updating a service on a set of mobile devices at a time not initiated or requested by the mobile devices.

For example, a service installed on a secure element might need to be updated urgently to fix a security vulnerability, or, in a less-urgent scenario, to enhance functionality. In order to facilitate such upgrades or updates, framework 150 determines which mobile devices will have the set of instructions processed for them, when to interact with each mobile device, and how the processing will be coordinated with other entities (e.g., central TSM 103) on the network. In one example embodiment, the framework 150 includes a cube which manages communications with other devices on the network via a common proxy included in ESB 101, and specifically to call functions to be performed by the devices, as described below.

Figure 2:
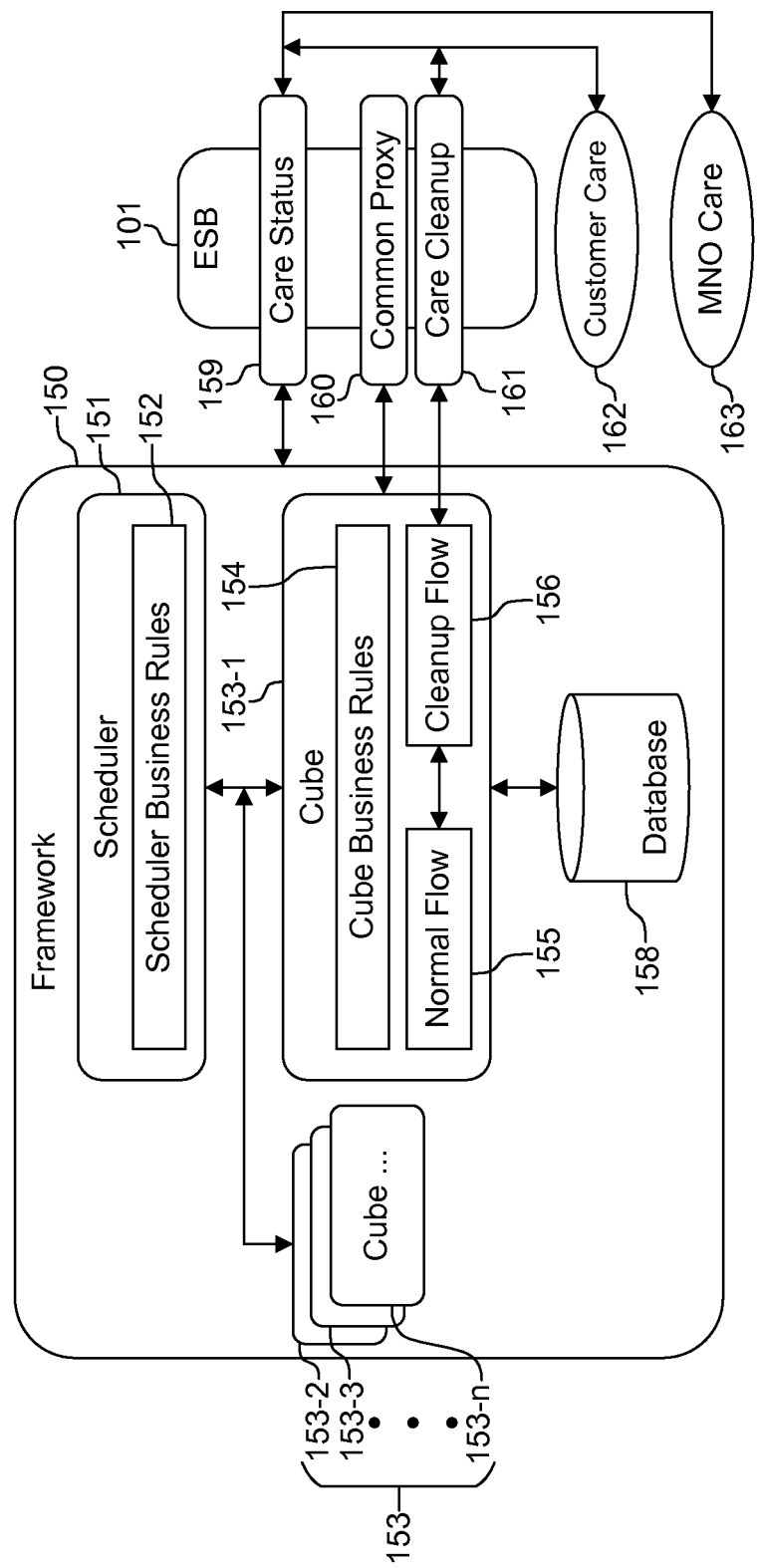
FIG. 2 is a block diagram illustrating a framework for processing according to an example embodiment.

FIG. 2 is a block diagram illustrating a framework (e.g., FIG. 1, framework 150) for pool processing according to an example embodiment.

In particular, FIG. 2 depicts elements of a framework for pool processing of sets of instructions, along with other entities illustrated in the system of FIG. 1 which may interact with framework 150. As described above, framework 150 includes memory, which may include a database 158 for storing a list of mobile devices with which the framework 150 may interact or for which sets of instructions may be processed. In one example embodiment, the database 158 stores a list of mobile devices specifically meeting predefined criteria (e.g., those devices which meet predefined criteria corresponding to a campaign, such as a model number or an outdated version of a service). The database 158 may store information about each mobile device such as a secure element ID identifying a secure element of (or corresponding to) a mobile device, a mobile device identifier (MEID) or a wallet ID. Database 158 is described in more detail below with reference to FIG. 4.

Framework 150 may also include a scheduler 151 in its memory. Scheduler 151 includes and/or stores information indicating when to interact with mobile devices to process sets of instructions. Specifically, scheduler 151 may include a time of day, day of week, duration, start and end date, or any other timing identification, for processing one or more workflows in a cube (e.g. cube 153-1), each workflow (e.g., normal flow 155 or cleanup flow 156) including one or more sets of instructions. Cube 153 is described more fully below with reference to FIG. 2, as well as later with reference to FIG. 3 to FIG. 5.

Scheduler 151 may define a window of time including at least a start time to start processing of the one or more workflows, and outside of which no new workflows can be initiated until the next scheduled window.

In a more specific example, scheduler 151 might define a start time to initiate processing of workflows as 10:00 AM daily, and an end time as 10:30 AM daily. A first workflow might start at 10:00 AM and run for 25 minutes (ending at 10:25). A second workflow might start at 10:25 AM and also run for 25 minutes (ending at 10:50 AM). In this example, even though the processing of the second workflow goes beyond the end time of the window at 10:30 AM, the second workflow is allowed to complete because it started before the end time of the window. Meanwhile, a third workflow which does not initiate during the window might be postponed until 10:00 AM the following day. Each workflow may be executed by pool processing, i.e., concurrent multi-device processing, in which one or more workflows are processed concurrently, at least in part, for multiple devices.

Accordingly, a schedule can be generated or stored including at least a start time to start processing of the one or more workflows corresponding to a desired function (e.g., updating a service). Scheduler 151 might include scheduler business rules 152, which indicate how devices corresponding to a workflow can be slotted into a schedule. For example, business rules 152 may encode rules from a service provider regarding a deadline for completing processing of the one or more workflows or windows of time as mentioned above. In another example, a service provider may request that a service on a newer model of mobile device is updated before an older model, and thus such preferences can be coded into scheduler business rules 152 so that scheduler 151 has guidance in scheduling tasks or processing. In still another example, scheduler 151 might manage the execution for multiple concurrent cubes, each containing one or more workflows.

Cubes 153-1, 153-2, . . . , 153-*n* (collectively "153") are each a portion of memory having stored thereon business rules and one or more executable workflows. Each workflow includes one or more sets of instructions for coordinating desired processing. Each instruction includes, for example, functions, data, and information needed to accomplish a task for a mobile device. Each cube is stored in framework 150. The one or more workflows are processed for each of the one or more devices meeting the predefined criteria by executing the set of instructions included in the one or more workflows. Executing the set of instructions included in the one or more workflows includes calling one or more functions to be performed by one or more communicatively coupled systems (e.g., updating a service). The calling of the functions to be performed by the communicatively coupled systems may be accomplished using a common proxy 160 in or communicatively coupled to ESB 101, which allows access to each of the devices.

In that regard, common proxy 160 is an interface which communicates data, including calls to one or more functions, to communicatively coupled devices on the network (e.g., central TSM 103) or systems, to process one or more sets of instructions for a mobile device. Specifically, common proxy 160 comprises or has access to one or more functions which are executed by a processor in order to act as an interface between cube 153 and other devices. Thus, common proxy 160 allows cube 153 to access all of the functions/instructions available at the devices on the network, and to rely on those to process the sets of instructions.

Through common proxy 160, therefore, each cube 153 in framework 150 coordinates processing of its one or more workflows by executing the corresponding set of instructions, which in turn accomplish a task such as updating a service by calling one or more functions to be performed by one or more of the devices on the network (e.g., central TSM 103, wallet server 102, MNO 106a-1, ESB 101, and the like). Each cube 153 can identify the specific needs for its execution. To populate the workflow, cube 153 communicates with scheduler 151 and database 158.

As shown in FIG. 2, multiple cubes 153 can be created, such as for different campaigns. In that regard, processing may be "campaign-wide". For example, there may be a campaign issued by a service provider which requires updating a specific service or applet on certain models of a mobile device (e.g., all 5,000 handsets of a particular model). Generally the cube 153 is executed in order to accomplish such processing for a pool of mobile devices, for instance, in situations where the user does not request such processing in real-time. For example, a campaign may require updating all payment services, and cube 153 facilitates doing so even without a specific request from a user, such as by performing the update overnight.

The processing performed by cube 153 is a type of pool processing, or concurrent multi-device processing, in which one or more workflows are processed concurrently, at least in part, for multiple devices at the same time, although not necessarily on all mobile devices targeted by the campaign at once. For example, a campaign may require updating a specific service on the secure element of 5,000 mobile devices of a particular model. If it is inefficient or otherwise not feasible to update services on all 5,000 devices at once, cube 153 may operate on a set number of mobile devices, such as 30 devices at a time. In addition, in some cases, a "sanity check" can be run by attempting the processing on a smaller group of devices before expanding to a larger pool.

In one embodiment, the pool may be defined as a subset of IDs from a larger or separate database, and specifically a subset of IDs corresponding to mobile devices meeting predefined criteria. A device ID and data corresponding to each of the one or more mobile devices meeting the predefined criteria is then stored in database 158. For example, a database in central TSM 103 might store identification of all mobile devices subscribed to a mobile commerce system. A device ID and data corresponding to each of the one or more devices meeting predefined criteria (such as device model or mobile network corresponding to a campaign) are extracted from the database of central TSM 103 and loaded into database 158 for processing by cube 153.

In this regard, examples of pool processing are described below in the context of identifying devices using a secure element ID, but it should be understood that devices may be identified using other data, such as MEID or wallet ID.

Pool processing according to the embodiments herein does not require that processing corresponding to all devices in each pool be completely finished before scheduling the next devices for a pool. Rather, a secure element ID of another mobile device is added to the pool as processing is completed for a secure element ID of a mobile device in the pool, regardless of whether processing has completed for all secure element IDs in the pool. Thus, another secure element is slotted into the pool as a previous secure element finishes.

For example, in a pool of 30 devices, the system does not wait for all 30 devices to complete a service update before adding another 30 devices to the pool. Such a model would "hang up" or delay processing for any other devices until the slowest of the 30 devices has completed the service update. Rather, for example, if the fastest of the 30 devices updates first, another device is immediately added to the pool in its place.

Thus, in one aspect, one or more workflows are processed for the one or more devices meeting the predetermined criteria by setting up a pool of device IDs corresponding to a subset of the devices to be concurrently processed, and processing, concurrently, the one or more workflows for each of the one or more devices in the pool. Moreover, a new device ID is added to the pool when processing is completed for one of the devices in the pool.

The predetermined criteria for selecting particular mobile devices to be processed may be selected prior to instantiation of cube 153, and can include, for example, the current version of the service to be updated, mobile carrier, the last time the user logged into a mobile wallet, a wallet status (e.g., active vs. non-active), etc. For example, a service provider or other element of the mobile commerce network may request to update all instances of a payment service on a certain model of mobile device as part of a campaign. Thus, in one example a service provider can select which mobile devices to extract from a larger database (e.g., a database on central TSM 103) to database 158 for processing by cube 153. In some cases, additional criteria may be obtained in real-time, such as whether a user is currently logged into a mobile wallet, in order to ensure that the updating does not interfere with processing currently being performed at or by the mobile device.

Cube 153 includes cube business rules 154, which govern how the workflow can be implemented. For example, some business rules might instruct coordinating updating of a mobile wallet on secure element 104a-1 using central TSM 103, whereas other rules might instruct updating a mobile wallet on secure element 104a-1 without using central TSM 103. In one embodiment, the one or more workflows corresponding to the cube 153, which are generated based on business rules 154, are first validated by communicating with a rules engine in order to ensure that, for example, the sets of instructions are still current. Other business rules may concern the availability and necessity of the update for each device. In addition, a user interface or other input may be provided to add, delete, or modify business rules for a specific cube. These rules can be reusable across cubes and can thereby apply a set of predefined rules and only create new rules that are specific to a new cube being created.

Cube 153 further includes normal flow 155 and cleanup flow 156. Normal flow 155 contains a workflow for processing under normal conditions (e.g., without any errors being encountered), for example for processing a service update for mobile devices. Nevertheless, circumstances may arise in which normal processing of a workflow fails, and in such cases there is a chance that a mobile device could be left unusable. For simplicity, such a device may be referred to as an "error device". As such, cleanup flow 156 includes instructions to restore the error device to a normal state following such errors. This may be as simple as resetting a flag, or as complex as rolling back partial changes in preparation of a successive attempt at executing normal flow 155, and may include, for example, updating states in database 158, sending instructions to an internal or external system, messaging the user of the mobile device, or other steps as deemed necessary. Thus, according to this aspect, one of the workflows is a cleanup workflow in which an error device that has encountered an error is identified and a cleanup workflow is executed for that error device.

In some embodiments, cleanup flow 156 may be initiated by customer care system or entities such as mobile commerce customer care 162. Cleanup flow 156 may be validated prior to processing to ensure that it does not conflict with other automated clean-up processing executed by other entities on the network. In some cases, scheduler business rules 152 can ensure that normal flow 155 and cleanup flow 156 are not processed simultaneously, and that cleanup flow 156 is only processed for devices in an error state. In addition, in some cases, a last step of cleanup flow 156 may be to initiate processing of normal flow 155. Moreover, a supporting cube can be created to monitor for errors and attempt processing of cleanup flow 156, running at different and/or overlapping hours with normal flow 155.

As shown in FIG. 2, cube 153 communicates with ESB 101, in order to facilitate access to other entities on the network. In that regard, as described above, ESB 101 is hardware and/or software that is implemented to serve as an intermediary between service provider systems 105, wallet server 102, central TSM 103 and mobile devices 104, among others. Thus, ESB 101 acts as the gateway for cube 153 to instruct other devices on the network (e.g., central TSM 103) to perform a function for or on the secure element of a mobile device, such as updating of a service.

As mentioned above, common proxy 160 is included in ESB 101. Common proxy 160 allows cube 153 to have access to all of the elements of the mobile commerce platform shown in FIG. 1 via ESB 101. Thus, cube 153 populates and schedules tasks at its end, and takespps advantage of processes/services which are ready to be processed (and have already been tested) at central TSM 103/ESB 101/etc. via common proxy 160. In other words, the processing or code corresponding to desired tasks already exists at e.g., central TSM 103, ESB 101, wallet server 102, and/or other devices on network 107, and cube 153 simply coordinates their processing through common proxy 160.

That is, according to some embodiments, cube 153 does not actually contain the functions to be executed for the mobile device or secure element, but rather includes the workflow indicating which devices on the network should perform which functions in order to obtain the desired result. For example, the workflow of cube 153 might coordinate central TSM 103 to install a service update on secure element 104a-1, but does not itself contain the update, nor execute the actual updating function (which is performed between central TSM 103 and secure element 104a-1). As a consequence, it is ordinarily possible to leverage existing devices and functions on the network to be performed without a specific request by a user, while at the same time not requiring new devices or functions to be created from scratch and/or tested.

To update a service or otherwise execute its workflow for a secure element without a specific request from a user, cube 153 may, for example, request central TSM 103 via ESB 101 to "wake up" the mobile device (without alerting the user), and instruct the mobile device to establish an internet protocol (IP) connection or other connection, so that commands can be sent down to the mobile device.

Customer care 162 and MNO care 163 correspond to customer care entities of the mobile commerce platform shown in FIG. 1 and for mobile network operators, respectively. These entities communicate with framework 150 in order to establish or modify scheduler business rules 152 or cube business rules 154 based on customer needs. For example, if a customer contacts customer care 162 and indicates that his/her mobile device is not working, customer care can communicate with framework 150 to modify (or circumvent) the scheduler 151, so as to ensure that a processing flow (e.g., cleanup flow 156) is executed for the user's device immediately. To that end, both customer care 162 and MNO care 163 communicate with care cleanup 161 of ESB 101, which in turn communicates with cleanup flow 156 in cube 153.

III. Process

Figure 3:
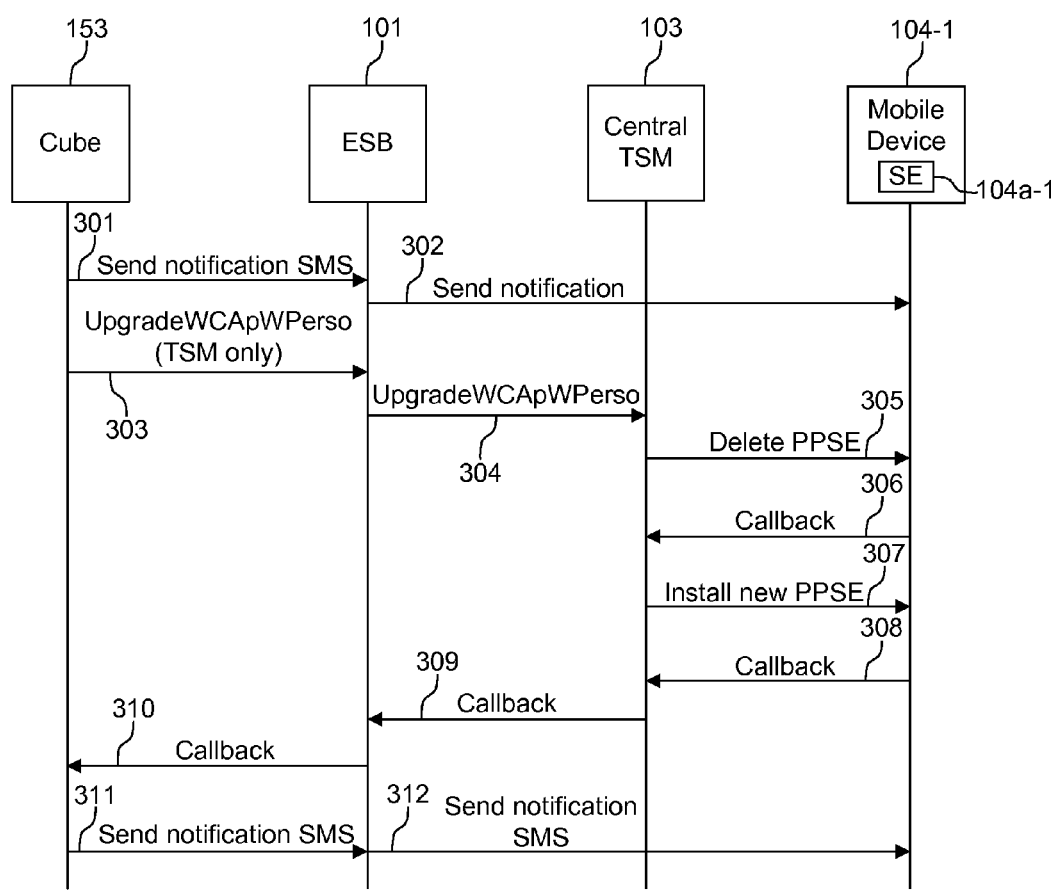
FIG. 3 is a sequence diagram illustrating an example of processing according to an example embodiment.

FIG. 3 is a sequence diagram for illustrating an example of processing according to an example embodiment, and in particular for upgrading (or updating) a proximity payment system environment (PPSE) applet on a secure element to enable new functionality. Thus, in this example, one of the workflows is for updating one or more applets applet on a secure element of a device. While the examples described below describe processing a workflow to update an applet on the secure element, it should be understood that "processing" as used herein can refer to other types of processing which can be coordinated on the network, including for a plurality of applets. For example, cube 153 may include a workflow to install a new applet on a mobile device, which might not require interaction with central TSM 103 at all.

In step 301, cube 153 sends a notification short message service (SMS) message to ESB 101 in step 301 to notify ESB 101 that a workflow is to be processed. In step 302, ESB 101 transmits a notification to mobile device 104-1, to "wake up" mobile device 104-1 (without necessarily alerting a user), and to instruct mobile device 104-1 to establish an IP connection or other connection, so that commands can be sent down to mobile device 104-1.

In step 303, cube 153 transmits a function request corresponding to the workflow (Upgrade Wallet Companion Applet Wallet Personalization, hereafter "UpgradeWCApW-Perso") to ESB 101. In step 304, ESB 101 transmits the UpgradeWCApWPerso command to central TSM 103, which coordinates the updating of the applet on mobile device 104-1. Specifically, in step 305, central TSM 103 instructs mobile device 104-1 to delete the current version of the PPSE on secure element 104a-1. In one example embodiment, step 305 may be triggered by a "pull" request initiated at a mobile wallet for example by a user via the mobile wallet interface. In step 306, mobile device 104-1 responds to central TSM 103 to confirm that the current version has been deleted. In step 307, central TSM 103 transmits a command to install the new PPSE (and, in some cases, the new PPSE itself) to mobile device 104-1 on secure element 104a-1. In step 308, mobile device 104-1 responds to central TSM 103 to confirm that the new version of the PPSE has been installed on secure element 104a-1.

In step 309, central TSM 103 issues a callback to ESB 101 indicating that updating was successful, and in step 310, ESB 101 passes similar information back to cube 153. At that time, in step 311, cube 153 sends a notification SMS to ESB 101 confirming that the updating process is complete, and in step 312 a notification SMS is transmitted from ESB 101 to mobile device 104-1. In response, mobile device 104-1 may, for example, disconnect from the IP connection and return to a sleep or lower power consumption mode. Once the processing is complete, cube 153 can be unscheduled and archived, and at retirement, removed from the active framework. In some aspects, a subsequent cube can replace a previous cube in the framework.

Figure 4:
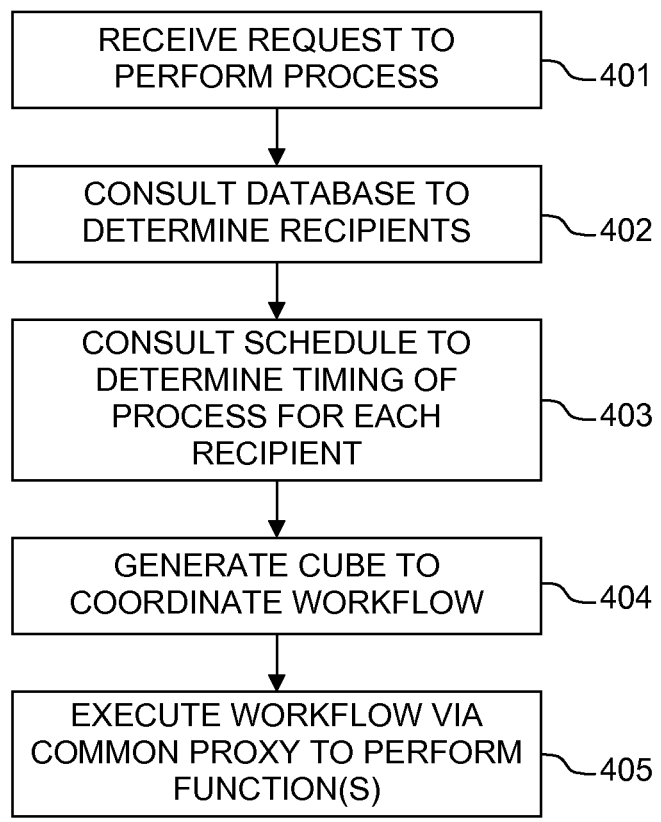
FIG. 4 is a flow diagram illustrating a process for managing processing according to an example embodiment.

FIG. 4 is a flow diagram illustrating a process for managing processing according to an example embodiment.

Briefly, in FIG. 4, a command is received to process one or more workflows, each of the one or more workflows including a set of instructions. A request for identification of one or more devices meeting predefined criteria is issued. A device identifier (ID) and data corresponding to each of the one or more devices meeting the predefined criteria are stored in a database. The one or more workflows are processed for each of the one or more devices meeting the predefined criteria by executing the set of instructions included in the one or more workflows. Executing the set of instructions included in the one or more workflows includes calling one or more functions to be performed by one or more communicatively coupled systems.

In more detail, in step 401, a request is received to process a workflow for one or more secure elements. For example, in connection with a campaign, a service provider (e.g., service provider 105-1) may request that an update be applied to the secure elements of all mobile devices which meet criteria such as a particular type, make and model, within a 30-day period. To that end, a service provider (e.g., service provider 105-1) can be provided with a graphical user interface to allow manual input of criteria and scheduling, although other methods of obtaining criteria are possible.

In step 402, database 158 is consulted to determine the recipients of the processing, after such information is loaded into database 158. In particular, in one example, a request is issued to identify one or more devices in a (separate) database of central TSM 103, of one or more devices meeting the predefined criteria corresponding to the workflow as discussed above. In response, a device identifier (ID) and data corresponding to each of the one or more devices meeting the predefined criteria are stored in a database in framework 150, e.g., database 158. More specifically, in one example, a database in central TSM 103 might store identification of all devices in a server (e.g., server 102), and a device ID and data corresponding to each of the one or more devices meeting predefined criteria (such as device model or mobile network corresponding to a campaign) are extracted and loaded into database 158 for processing.

The predefined criteria can be selected based on, for example, business rules. In particular, in connection with a campaign, a service provider (e.g., service provider 105-1) may wish to upgrade or update a PPSE applet on a secure element of all mobile devices of a certain manufacturer and having a certain current version of the PPSE applet.

In step 403, scheduler 151 is consulted to determine the timing of processing the workflow for each device meeting the predefined criteria. Specifically, the scheduler 151 stores a predefined time to initiate executing a cube workflow based on scheduler business rules 152, which are in turn derived from the campaign of the service provider. To that end, scheduler business rules 152 might indicate how mobile devices can be slotted into a schedule. For example, a service provider may request that a newer model of mobile device has the applet updated before an older model, and thus such preferences can be coded into scheduler business rules 152 so that scheduler 151 has guidance in scheduling tasks.

In one embodiment, scheduler 151 stores a start and stop date for cube 153, along with a day, time and duration for processing a workflow corresponding to cube 153. In addition, scheduler 151 may identify to an administrator or other entity any mobile devices or secure elements that are scheduled by workflows in more than one cube. This situation does not necessarily constitute a scheduling error, but rather provides additional information to ensure that no unintended overlaps are scheduled.

In step 404, the cube is generated in order to coordinate the workflow. As discussed in detail above, a cube (e.g., cube 153) is a portion and/or subset of memory comprising business rules and one or more executable workflows. Each workflow includes one or more sets of instructions for coordinating desired processing. Each instruction includes, for example, functions, data, and information needed to accomplish a task for a mobile device. Each cube is stored in framework 150. The one or more workflows are processed for each of the one or more devices meeting the predefined criteria by executing the set of instructions included in the one or more workflows. Executing the set of instructions included in the one or more workflows includes calling one or more functions to be performed by one or more communicatively coupled systems (e.g., updating a service). The calling of the functions to be performed by the communicatively coupled systems may be accomplished using a common proxy 160 in or communicatively coupled to ESB 101, which allows access to each of the devices. To coordinate processing of the workflow, cube 153 communicates with database 158 (to ascertain the identity of devices to be processed), and scheduler 151 (to determine when to process an individual device).

In step 405, the one or more workflows for each of the one or more devices meeting the predefined criteria are processed by executing the set of instructions included in the one or more workflows. Executing the set of instructions included in the one or more workflows includes calling one or more functions to be performed by one or more communicatively coupled systems. As mentioned above, common proxy 160 allows cube 153 to have access to all of the elements of the mobile commerce platform shown in FIG. 1 via ESB 101. Thus, cube 153 only needs to populate and schedule tasks at its end, and the corresponding functions are ready to be processed (and have already been tested) at central TSM 103/ESB 101/etc. This allows for workflows to be created and processed more efficiently, without the need to create new functions.

In one embodiment, activity of cube 153 can be logged to facilitate debugging, troubleshooting, and performance monitoring. Thus, in one example, a memory stores a results database which stores results of processing the one or more workflows. For example, daily status or final summary reports can be generated to indicate, for instance, the total number of mobile devices included in the predefined criteria, a running total of the number of functions performed (e.g. the total number of wallets updated during the life of the cube 153 or during an execution period), any errors encountered during execution and the number and type of such errors, and the like. Other logged information might include the status of the cube (e.g., completed, active, scheduled), and any state changes. To that end, service providers, clients, or administrators may be provided with a user interface by which to access such information. In another embodiment, errors or successes may be notified in real-time.

Figure 5:
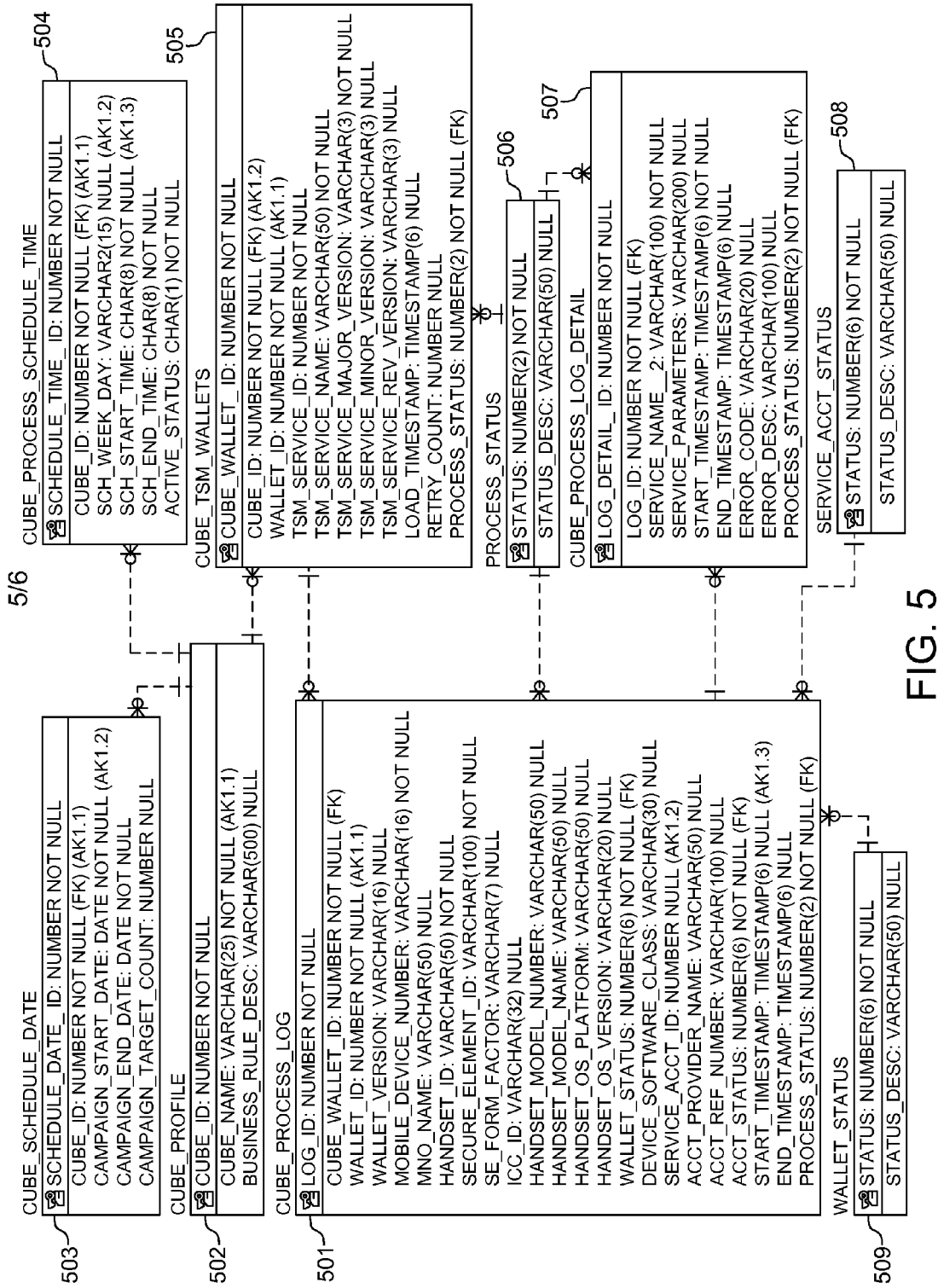
FIG. 5 is block diagram for illustrating a data scheme for processing sets of instructions according to an example embodiment.

FIG. 5 is a block diagram for illustrating a data scheme for processing sets of instructions according to an example embodiment.

Specifically, CUBE_PROCESS_LOG 501 is an example of a process log generated as part of cube 153, storing devices corresponding to a workflow.

To that end, CUBE_PROCESS_LOG 501 includes data elements such as those listed and described below in Table 1:

TABLE 1

| Element | Description |
|---|---|
| LOG_ID | an identifier of the process log itself |
| CUBE_WALLET_ID | an identifier (ID) for a mobile wallet being updated by the workflow of cube 153 |
| WALLET_ID | a more general ID of the mobile wallet on the system (e.g., separate from the cube) |
| WALLET_VERSION | a version of the mobile wallet |
| MOBILE_DEVICE_NUMBER | the phone number of the mobile wallet being updated |
| MNO_NAME | an identifier of the mobile network operator associated with the mobile device |
| HANDSET_ID | an identifier for the handset |
| SECURE_ELEMENT_ID | an identifier associated with the secure element on the mobile device |
| SE_FORM_FACTOR | a form factor of the secure element |
| ICC_ID | a unique serial number of a SIM card or other identification module |
| HANDSET_MODEL_NUMBER | a model number of the handset/mobile device |
| HANDSET_MODEL_NAME | a name of the handset/mobile device |
| HANDSET_OS_PLATFORM | an operating system platform of the handset/mobile device |
| HANDSET_OS_VERSION | an operating system version of the handset/mobile device |
| WALLET_STATUS_NUMBER | a status of the mobile wallet to be processed |
| DEVICE_SOFTWARE_CLASS | a software class of the mobile device/handset |
| SERVICE_ACCT_ID | an account identifier for the service and/or process being executed |
| ACCT_PROVIDER_NAME | an account provider for the account corresponding to the mobile wallet |
| ACCT_REF_NUMBER | a reference number for the account corresponding to the mobile wallet |
| ACCT_STATUS | a status of the account corresponding to the mobile wallet (e.g., active or not) |
| START_TIMESTAMP and END_TIMESTAMP | a start and end time of processing the workflow |
| PROCESS_STATUS | a current status of processing the workflow |

It should be understood that these data elements are simply examples, and numerous other data elements could be stored or used.

CUBE_PROFILE 502 includes identifying information of the cube itself using data elements such as those listed and described below in Table 2:

TABLE 2

| Element | Description |
|---|---|
| CUBE_ID | an identifier of the cube |
| CUBE_NAME | a name of the cube |
| BUSINESS_RULE_DESC | a description of business rules corresponding to the cube (e.g., update the PPSE applet for devices having a certain model and an outdated version). |

CUBE_SCHEDULE_DATE 503 includes information about the timing of the campaign (e.g., update PPSE applet) corresponding to the cube using data elements such as those listed and described below in Table 3:

TABLE 3

| Element | Description |
|---|---|
| SCHEDULE_DATE_ID | an identifier for this set of information |
| CUBE_ID | an identifier the of the corresponding cube |
| CAMPAIGN_START_DATE | a date when the campaign begins |
| CAMPAIGN_END_DATE | a date when the campaign ends |
| CAMPAIGN_TARGET_COUNT | a target number of devices which should be processed according to the campaign |

CUBE_PROCESS_SCHEDULE_TIME 504 indicates the timing for processing the workflows included in the cube and includes data elements such as those listed and described below in Table 4:

TABLE 4

| Element | Description |
|---|---|
| SCHEDULE_TIME_ID | an identifier for the schedule time block 504 |
| CUBE_ID | an identifier for the associated cube |
| SCH_WEEK_DAY | a weekday on which to begin processing the workflows |
| SCH_START_TIME and SCH_END_TIME | a start and end time for processing the workflows |
| ACTIVE_STATUS | an indicator of whether the processing of the workflows is currently active |

CUBE_TSM_WALLETS 505 stores information corresponding to the mobile wallets in the mobile devices to be affected by the workflow, and is loaded from the TSM database into the database at the start of a campaign, including data elements such as those listed and described below in Table 5:

TABLE 5

| Element | Description |
|---|---|
| CUBE_WALLET_ID | an identifier for this set of information |
| CUBE_ID | an identifier of the cube |
| WALLET_ID | an identifier for the wallet |
| TSM_SERVICE_ID | an identifier in the TSM corresponding to a service to be updated |
| TSM_SERVICE_NAME | a name in the TSM corresponding to the service to be updated |
| TSM_SERVICE_MAJOR_VERSION | an identifier for a major version in the TSM corresponding to the service to be updated |
| TSM_SERVICE_MINOR_VERSION | an identifier for a minor version in the TSM corresponding to the service to be updated |
| TSM_SERVICE_REV_VERSION | an identifier for a revision version in the TSM corresponding to the service to be updated |
| LOAD_TIMESTAMP | a time stamp of when the service has been loaded into the wallet |
| RETRY_COUNT | a number of times the updating has been retried |
| PROCESS_STATUS | a current status of the updating |

PROCESS_STATUS 506 stores a STATUS number indicating a current status of the process (e.g., whether updating has been executed), and may include a data element such as the one shown and described in Table 6 below:

TABLE 6

| Element | Description |
|---|---|
| STATUS_DESC | a description of the current status |

CUBE_PROCESS_LOG_DETAIL 507 stores information about multiple updates, including data elements such as those listed and described in Table 7 below:

TABLE 7

| Element | Description |
|---|---|
| LOG_DETAIL_ID | an identifier for this set of information |
| LOG_ID | an identifier for CUBE_PROCESS_LOG 501 |
| SERVICE_NAME and SERVICE PARAMETERS | a name and parameters for the service to be updated |
| START_TIMESTAMP and END_TIMESTAMP | a start and end time of the update |
| ERROR_CODE and ERROR_DESC | a code and description for errors which occur during the update (if any) |
| PROCESS_STATUS_NUMBER | a current status of the update |

SERVICE_ACCT_STATUS 508 indicates a status for the service account corresponding to the mobile device, such as whether the account is active or not, including data elements such as those listed and described in Table 8 below:

TABLE 8

| Element | Description |
|---|---|
| STATUS_NUMBER and STATUS_DESC | a code and description for the status of the service account |

WALLET_STATUS 509 indicates a status for the mobile wallet corresponding to the mobile device, such as whether the wallet is active or not, including data elements such as those listed and described in Table 9 below:

TABLE 9

| Element | Description |
|---|---|
| STATUS_NUMBER and STATUS_DESC | a code and description for the status. |

IV. Computer Readable Medium Implementation

The present invention (e.g., systems 100 and 150, processes 300-400, or any part(s) or function(s) thereof) can be implemented using hardware, software, or a combination thereof, and can be implemented in one or more mobile devices or other processing systems. To the extent that manipulations performed by the present invention were referred to in terms of human operation, no such capability of a human operator is necessary, or desirable in most cases, in any of the operations described herein which form part of the present invention. Rather, the operations described herein are machine operations. Useful machines for performing the operations of the present invention include mobile devices, smartphones, personal digital assistants (PDAs) or similar devices.

Figure 6:
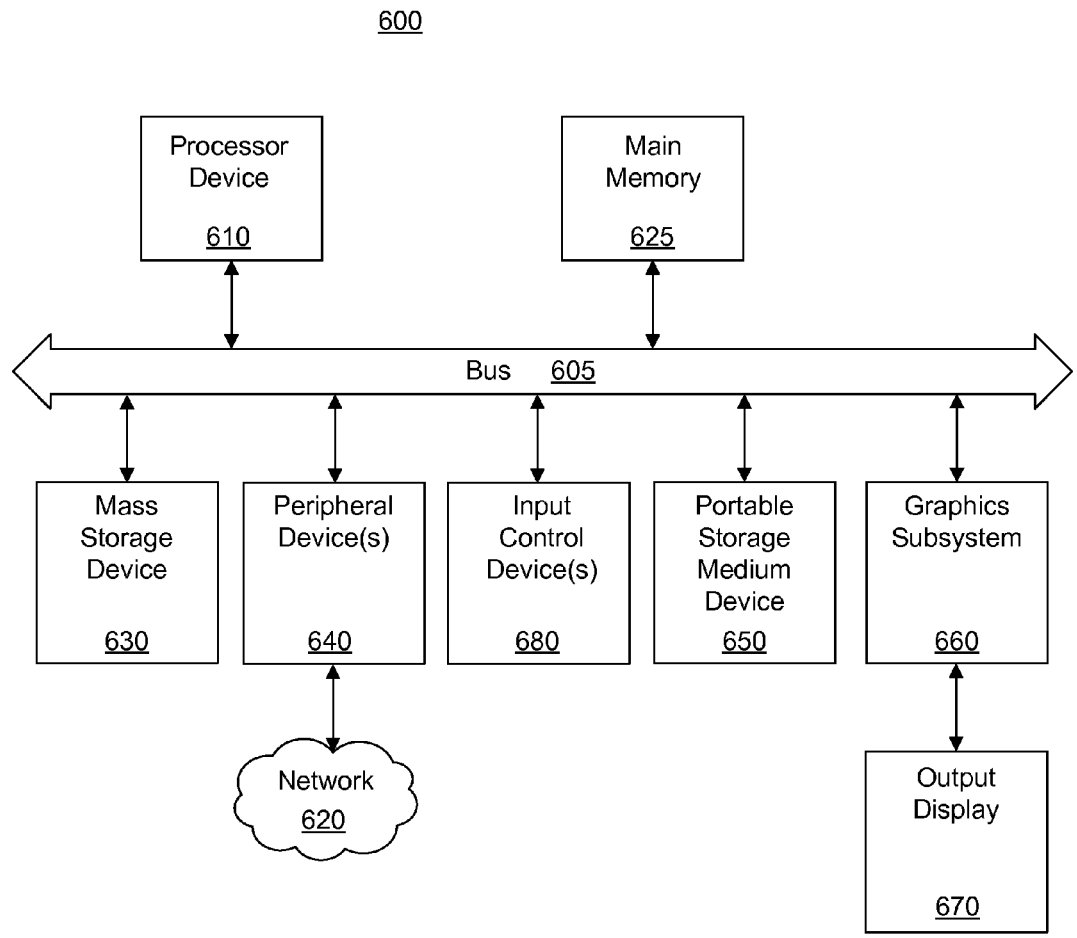
FIG. 6 is a block diagram of an example system useful for implementing the present invention.

In one embodiment, the invention is directed toward one or more systems capable of carrying out the functionality described herein. FIG. 6 is a block diagram of a general and/or special purpose computer 600, which may be a general and/or special purpose computing device, in accordance with some of the example embodiments of the invention. The computer 600 may be, for example, a consumer device, a consumer computer, a client computer and/or a server computer, among other things.

The computer 600 may include without limitation a processor device 610, a main memory 625, and an interconnect bus 605. The processor device 610 may include without limitation a single microprocessor, or may include a plurality of microprocessors for configuring the computer 600 as a multi-processor system. The main memory 625 stores, among other things, instructions and/or data for execution by the processor device 610. The main memory 625 may include banks of dynamic random access memory (DRAM), as well as cache memory.

The computer 600 may further include a mass storage device 630, peripheral device(s) 640, portable non-transitory storage medium device(s) 650, input control device(s) 680, a graphics subsystem 660, and/or an output display interface 670. For explanatory purposes, all components in the computer 600 are shown in FIG. 6 as being coupled via the bus 605. However, the computer 600 is not so limited. Devices of the computer 600 may be coupled via one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 may be a nonvolatile storage device for storing data and/or instructions for use by the processor device 610. The mass storage device 630 may be implemented, for example, with a magnetic disk drive or an optical disk drive. In a software embodiment, the mass storage device 630 is configured for loading contents of the mass storage device 630 into the main memory 625.

The portable storage medium device 650 operates in conjunction with a nonvolatile portable storage medium, such as, for example, a compact disc read only memory (CD-ROM), to input and output data and code to and from the computer 600. In some embodiments, the software for storing information may be stored on a portable storage medium, and may be inputted into the computer 600 via the portable storage medium device 650. The peripheral device(s) 640 may include any type of computer support device, such as, for example, an input/output (I/O) interface configured to add additional functionality to the computer 600. For example, the peripheral device(s) 640 may include a network interface card for interfacing the computer 600 with a network 620.

The input control device(s) 680 provide a portion of the consumer interface for a consumer of the computer 600. The input control device(s) 680 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 600 may include the graphics subsystem 660 and the output display 670. The output display 670 may include a cathode ray tube (CRT) display and/or a liquid crystal display (LCD). The graphics subsystem 660 receives textual and graphical information, and processes the information for output to the output display 670.

Each component of the computer 600 may represent a broad category of a computer component of a general and/or special purpose computer. Components of the computer 600 are not limited to the specific implementations provided here.

The example embodiments described above such as, for example, the systems and procedures depicted in or discussed in connection with FIGS. 1 to 6, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A process management system, comprising:
    at least one memory operable to store a database and one or more workflows, each of the one or more workflows including a set of instructions comprising instructions to transmit a command to a computing device to wake up the respective computing device without presenting notification on the computing device of receipt of the instructions and to establish a network connection with the system to transmit one or more commands to the computing device; and
    a processor coupled to the at least one memory, the processor being able to:
        receive a command to process the one or more workflows;
        issue a request for identification of one or more computing devices meeting one or more predefined criteria;
        store a computing device identifier (ID) and data in the database corresponding to each of the one or more computing devices meeting the one or more predefined criteria; and
        process the one or more workflows for each of the one or more computing devices meeting the one or more predefined criteria by executing the set of instructions included in the one or more workflows, wherein executing the set of instructions included in the one or more workflows includes calling one or more functions to be performed by one or more communicatively coupled systems associated with the process management system and wherein executing the set of instructions further includes communicating the command to the one or more computing devices meeting the one or more predefined criteria to wake up each respective computing device and to establish the network connection with the system.

2. The system according to claim 1, wherein the processor is further operable to generate a schedule including at least a start time to start processing of the one or more workflows.

3. The system according to claim 1, further comprising a common proxy for communicating data, including requests to call the one or more functions, to the one or more communicatively coupled systems.

4. The system according to claim 1, wherein the memory is further operable to store a results database which stores results of processing the one or more workflows.

5. The system according to claim 1, wherein the processor is further operable to validate the one or more workflows by communicating with a rules engine.

6. The system according to claim 1, wherein the predefined criteria comprise a type and model of a computing device.

7. The system according to claim 1, wherein one of the workflows is a cleanup workflow, and wherein the processor is further operable to:
    identify an error computing device that has encountered an error; and
    execute the cleanup workflow for the error computing device.

8. The system according to claim 1, wherein one of the workflows is for updating an applet on a secure element of a computing device.

9. The system according to claim 1, wherein the processor is further operable to process the one or more workflows for the one or more computing devices meeting the one or more predetermined criteria by:
    setting up a pool of device IDs corresponding to a subset of the computing devices to be concurrently processed; and
    processing, concurrently, the one or more workflows for each of the one or more computing devices in the pool.

10. The system according to claim 9, wherein the processor is further operable to:
    add a new computing device ID to the pool when processing is completed for one of the computing devices in the pool.

11. The system according to claim 1, wherein the processor is further operable to request, from one of the one or more computing devices, a time range in which processing the one or more workflows may be initiated.

12. A computer-implemented method, comprising:
    receiving, using one or more computing devices associated with a process management system, a command to process one or more workflows, each of the one or more workflows including a set of instructions comprising instructions to transmit a command to a computing device to wake up the respective computing device without presenting notification on the computing device of receipt of the instructions and to establish a network connection with the system to transmit one or more commands to the computing devices;
    issuing, using the one or more computing devices, a request for identification of one or more computing devices meeting one or more predefined criteria;
    storing, using the one or more computing devices a device identifier (ID) and data in a database corresponding to each of the one or more computing devices meeting the one or more predefined criteria; and
    processing, using the one or more computing devices, the one or more workflows for each of the one or more computing devices meeting the one or more predefined criteria by executing the set of instructions included in the one or more workflows, wherein executing the set of instructions included in the one or more workflows includes calling one or more functions to be performed by one or more communicatively coupled systems associated with the process management system and wherein executing the set of instructions further includes communicating the command to the one or more computing devices meeting the one or more predefined criteria to wake up each respective computing device and to establish the network connection with the system.

13. The method according to claim 12, further comprising generating, using the one or more computing devices a schedule including at least a start time to processing of the one or more workflows.

14. The method according to claim 12, wherein data, including requests to call the one or more functions, are communicated to the one or more communicatively coupled systems via a common proxy.

15. The method according to claim 12, further comprising storing, using the one or more computing devices, results of processing the one or more workflows in a results database.

16. The method according to claim 12, further comprising validating, using the one or more computing devices, the one or more workflows by communicating with a rules engine.

17. The method according to claim 12, wherein the predefined criteria comprise a type and model of a computing device.

18. The method according to claim 12, wherein one of the workflows is a cleanup workflow, and wherein the method further comprises:
   identifying, using the one or more computing devices, an error computing device that has encountered an error; and
   executing, using the one or more computing devices, the cleanup workflow for the error computing device.

19. The method according to claim 12, wherein one of the workflows is for updating an applet on a secure element of a computing device.

20. The method according to claim 12, wherein the processing of the one or more workflows for the one or more devices meeting the one or more predetermined criteria further comprises:
   creating, using the one or more computing devices, a pool of device IDs corresponding to a subset of the computing devices to be concurrently processed; and
   processing, concurrently and using the one or more computing devices, the one or more workflows for each of the one or more computing devices in the pool.

21. The method according to claim 20, further comprising adding, using the one or more computing devices, a new computing device ID to the pool when processing is completed for one of the devices in the pool.

22. The method according to claim 12, further comprising requesting, using the one or more computing devices and from one of the one or more computing devices meeting the one or more predefined criteria, a time range in which processing the one or more workflows may be initiated.

23. A computer program product, comprising:
   a non-transitory computer-readable medium having computer-executable instructions stored thereon that when executed by one or more processors cause the one or more processors to manage processes, the computer-executable instructions comprising:
   computer-executable program instructions to receive a command to process one or more workflows, each of the one or more workflows including a set of instructions comprising instructions to transmit a command to a computing device to wake up the respective computing device without presenting notification on the computing device of receipt of the instructions and to establish a network connection with the system to transmit one or more commands to the computing device;
   computer-executable program instructions to issue a request for identification of one or more computing devices meeting one or more predefined criteria;
   computer-executable program instructions to store a device identifier (ID) and data in a database corresponding to each of the one or more computing devices meeting the one or more predefined criteria; and
   computer-executable program instructions to process the one or more workflows for each of the one or more computing devices meeting the one or more predefined criteria by executing the set of instructions included in the one or more workflows, wherein executing the set of instructions included in the one or more workflows includes calling one or more functions to be performed by one or more communicatively coupled systems associated with the one or more processors and wherein executing the set of instructions further includes communicating commands to the one or more computing devices meeting the one or more predefined criteria to wake up each respective computing device and to establish the network connection with the system.

* * * * *